GOODWIN, GAMAGE & GOODWIN.
Carriage-Step Guard.

No. 98,488.                                                       Patented Jan. 4, 1870.

United States Patent Office.

RICHARD H. GOODWIN, OF BOSTON, AND GIDEON L. GAMAGE, OF LYNN, MASSACHUSETTS, AND RICHARD J. P. GOODWIN, OF MANCHESTER, NEW HAMPSHIRE.

Letters Patent No. 98,488, dated January 4, 1870.

IMPROVED GUARD FOR CARRIAGE-STEPS.

The Schedule referred to in these Letters Patent and making part of the same.

*To all whom it may concern:*

Be it known that we, RICHARD H. GOODWIN, of Boston, in the county of Suffolk, and GIDEON L. GAMAGE, of Lynn, in the county of Essex, and State of Massachusetts, and RICHARD J. P. GOODWIN, of Manchester, in the county of Hillsborough, State of New Hampshire, have invented a new and improved "Guard for Carriage-Steps;" and we do hereby declare that the following is a full, clear, and exact description thereof, which will enable others skilled in the art to make and use the same, reference being had to the accompanying drawings, forming a part of this specification, in which—

Figure 1:
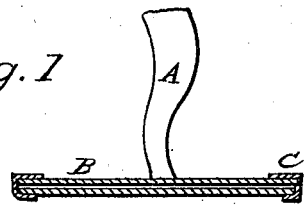
Figure 2:
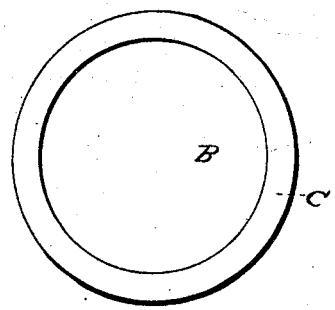

Figure 1 is a side elevation of this invention.
Figure 2 is a sectional view.
Similar letters of reference indicate like parts.

This invention relates to a covering of vulcanized rubber or other elastic material for carriage-steps, and is intended to prevent the foot from slipping in mounting and dismounting from carriages, wagons, and other vehicles.

It is a well-known fact that carriage-steps, from frequent use, become smooth and slippery, particularly in stormy weather, or when covered with ice; and, as in the case of expressmen, milkmen, and some others who are obliged to mount and dismount from their vehicles in a hurry, it becomes desirable that some efficient means should be employed to avoid the risk of falling and being seriously injured. Accidents frequently occur to aged people from this cause.

The invention consists in a covering of vulcanized-rubber packing or sheet-rubber, B, secured to the face of a carriage-step, A, by a flange-ring or shell of metal, C, capable of being hemmed over the under edge of the step and flattened down, thereby securely fastening the rubber to the face of the step, and giving a firm, yet elastic hold to the foot when stepped upon.

We have used other methods for securing the rubber to the steps, such as riveting; also in a rubber shell or cover moulded to overlap and encompass the edge of the step; but the method finally adopted by us, we have found to be the most practical, as by this means the edge of the rubber is protected from injury, and no dust of gravel is allowed to collect beneath the rubber.

It will be seen, by reference to the drawings, that the size of the rubber and of the shell may be of different sizes, to suit the various patterns of carriage-steps.

The prime object of this invention is to supply carriage and wagon-builders with an improved step, which may give to the purchaser of a vehicle an additional assurance of safety in getting in and out of his vehicle. These guards may also be applied to old steps with but a trifling outlay of labor.

Having thus described our invention,

We claim as new, and desire to secure by Letters Patent—

The step A, rubber covering B, and metallic shell C, all constructed and arranged in the manner and for the purpose set forth.

The above specification of our invention signed by us, this 23d day of April, A. D. 1869.

RICHARD H. GOODWIN.
GIDEON L. GAMAGE.
RICHARD J. P. GOODWIN.

Witnesses:
JESSE FARMER,
CHARLES F. LUTHER.